Figure 1:
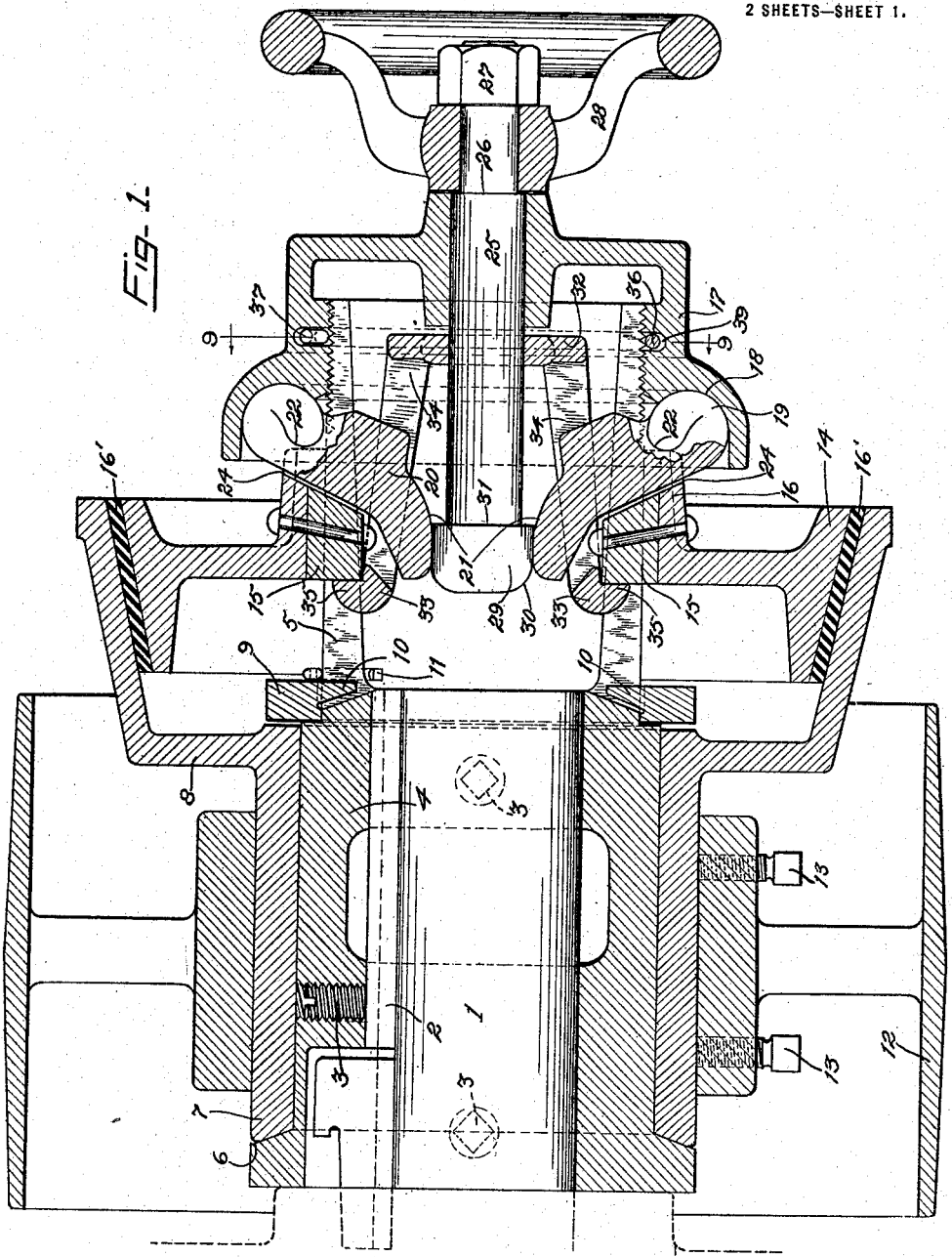

J. A. BRIED.
CLUTCH.
APPLICATION FILED JULY 24, 1915.

1,192,382.

Patented July 25, 1916.
2 SHEETS—SHEET 1.

WITNESS
Wm. F. Drew.

INVENTOR
Julian A. Bried
BY
Acmen & Totten
ATTORNEY

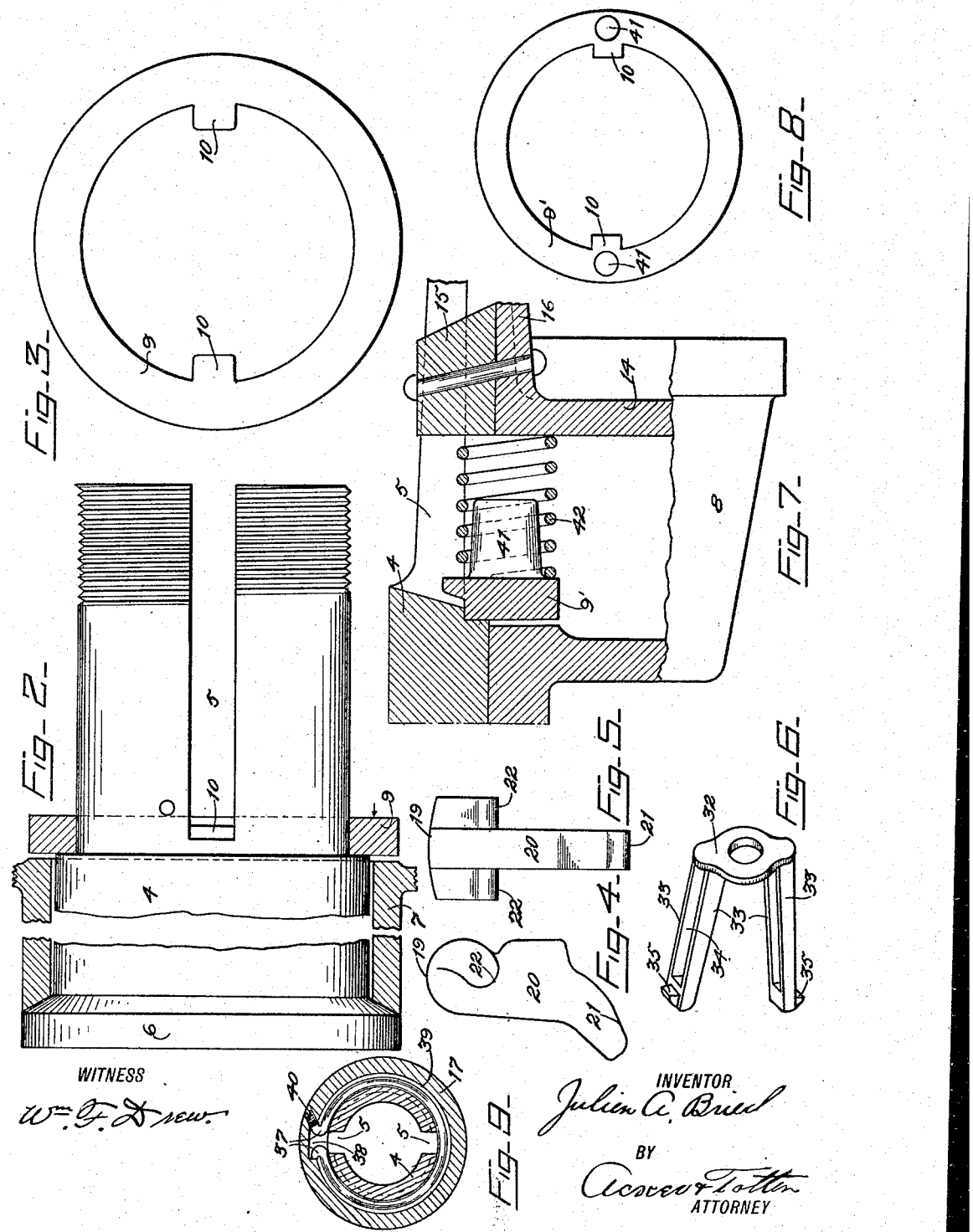

UNITED STATES PATENT OFFICE.

JULIEN A. BRIED, OF OAKLAND, CALIFORNIA.

CLUTCH.

1,192,382.  Specification of Letters Patent.  Patented July 25, 1916.

Application filed July 24, 1915.  Serial No. 41,678.

*To all whom it may concern:*

Be it known that I, JULIEN A. BRIED, a citizen of the United States, residing at Oakland, in the county of Alameda and State of California, have invented certain new and useful Improvements in Clutches, of which the following is a specification.

The present invention relates to improvements in friction clutches, and particularly to that type of clutch adapted for use with gas engines or the like, for clutching pulleys, sprockets, etc., to the driving or operating means, and the invention has for its principal objects to provide a clutch wherein the usual release or throw-out springs may be eliminated and disengagement accomplished with a positive manually controlled throw-out or release.

Other objects are to provide a single adjusting means, whereby the wear on the various parts may be compensated for and the throw or tension of engagement of the clutch surfaces may be regulated; to provide a single operating means for operating the engaging means to throw the clutching surfaces into engagement and also to operate the releasing means to disengage the clutching surfaces, and also to provide a self centering clutch to compensate for wear of the bearing.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in longitudinal section of an embodiment of my invention associated with a driving shaft and pulley, and in a position with the clutching surfaces forced into engagement. Fig. 2, is a view in detail of the tubular bearing sleeve, with the hub of the clutch drum rotatably mounted thereon, disclosing slots in the sleeve through which the clutch levers operate. Fig. 3 is a view in detail of the clutch drum retaining ring. Fig. 4 is a view in side elevation of one of the clutch levers. Fig. 5 is an end view of one of the clutch levers, disclosing more fully the cam surfaces or projections thereon. Fig. 6 is a view in detail of the throw-out or release yoke. Fig. 7 is a view partly in section of a modified form of releasing device, wherein springs are employed for disengaging the clutching surfaces, but wherein the possibility of touching of the opposing clutching members after disengagement is eliminated. Fig. 8 is a view in detail of the clutch drum retaining ring, disclosing the bosses around which are received one end of the throw-out springs. Fig. 9 is a sectional view taken on line 9—9 of Fig. 1.

Referring more particularly to the several views of the drawings, wherein like characters of reference designate corresponding parts throughout the several views,—1 indicates a suitable power shaft to which is secured, preferably by the key 2 and set screws 3, a tubular bearing sleeve 4, the outer end of which overhangs the end of the shaft 1 and is slotted, as at 5, to a point approximately flush with the end of said shaft. A beveled retaining flange 6 provided on the inner end of the bearing sleeve limits the inward end thrust of the clutch drum hub 7 rotatably mounted on said bearing sleeve, and also serves to center the clutch drum and its pulley when under engagement pressure, regardless of the wear of bearing. A drum 8 having an outwardly flared annular clutch surface is formed integral with or attached to the hub 7, and a retaining ring 9 provided with lugs 10 which are received in the slots 5, retains the clutch drum hub in position on the bearing sleeve and is in turn removably held in position on the bearing sleeve by a suitable cotter pin 11 or other means. A pulley or other member 12 to be driven is secured by the members 13 to the clutch drum hub 7 and is adapted to rotate therewith.

Slidably mounted on the outer end of the tubular bearing sleeve 4 is a clutch disk 14 which is prevented from rotating thereon by suitable lugs 15 secured to the hub 16 thereof and which project into the slots 5, and said disk is provided on its peripheral edge with a beveled clutch surface formed to seat with the opposing surface and which may be plain metal or shod with leather or other friction surface 16′, to provide an engaging means between the surfaces of the two members. An adjusting collar 17 is threaded over the outer end of the bearing sleeve 4 and is formed with an annular cup-shaped seat 18 on its inner end, and in said seat are received the rounded ends 19 of the clutch levers 20 which project through the slots 5 and which are formed on their opposite ends with the beveled surfaces 21. Eccentrically disposed lugs or cam surfaces 22 are formed on each side of the clutch levers 20 adjacent to the rounded ends 19 thereof, and the same operate against the end surface of the hub portion 16 of the slidable clutch disk at each side of the slots 24 formed therein and into which extend a portion of the clutch levers.

Extending through an opening through the hub of the adjusting collar 17 and disposed in axial alinement with the shaft 1 is slidably mounted an operating or controlling shaft or member 25 carrying on its outer end between a flange 26 and a retaining nut 27 a rotatable hand wheel 28. An enlarged head 29 is formed on the inner end of the controlling shaft or member 25 to coöperate with the clutch levers 20, and the same is provided with a rounded outer end surface 30 and an inner surface 31 extended at right angles to the surface of the shaft 25, and which last mentioned surface is for coöperating with the hereinafter mentioned throw-out yoke, and also to prevent the member 25 from being pulled out too far. A throw-out or releasing yoke 32 is loosely mounted on the controlling shaft 25 within the overhanging portion of the tubular bearing sleeve 4, and the arms 33 of said yoke are slotted longitudinally, as at 34, to permit the clutch levers to pass therethrough. The arms of said yoke carry on their ends suitable laterally extending fingers or projections 35 which extend into the slots 5 and engage the inner surface of the lugs 15. A suitable clamping wire 36 having turned over ends 37, which are received in a recess 38, is inserted in an annular groove 39 in the adjustable collar 17, and is adapted to encircle and engage the threaded portion of the bearing sleeve and maintain the adjusting collar in its adjusted position thereon. A set screw 40 regulates the pressure of the clamping wire about the bearing sleeve.

In the construction disclosed in Figs. 7 and 8, the throw-out or releasing yoke is eliminated and the retaining ring 9', which rests against a shoulder formed on the hub of the tubular bearing sleeve and which is in slight spaced relation to the drive supporting hub 7, is formed with suitable projections or studs 41 on which are positioned the coiled releasing springs 42, which exert pressure against the rear face of the clutch disk 14 to disengage the clutching members when the enlarged head 29 is drawn from between the clutch levers 20. In this construction, unlike the devices now in use wherein a spring throw-out or release is employed, friction between the rotating parts and the spring supporting ring is eliminated, owing to the supporting ring and ends of the springs contacting with parts which operate together, by reason of the reacting shoulder.

Assuming the parts to be in a position as in Fig. 1, the operation of the device is as follows:—To disengage the clutching surfaces the operator grasps the loosely mounted hand wheel 28 and pulls the same outwardly, which withdraws the enlarged head 29 from contact with the clutch levers 20, which in turn will release the pressure of the cam surface 22, against the end of the hub 16. The continued withdrawal of the shaft 25 will cause the shoulder 31 to contact with the hub of the throw-out or release yoke 32 and operate the same to cause the fingers 35 thereof to disengage the clutch disk 14 from the clutch drum 8 and to slide the disk 14 a short distance longitudinally relative to the bearing sleeve 4. To throw the clutch members into engagement, it is only necessary to force the shaft inwardly and the enlarged end thereof will force outwardly the clutch levers to cause the cam surfaces thereof to force the movable clutch member into engagement with its coöperating member. The collar 17 may be readily adjusted on the outer end of the bearing sleeve to move the fulcrum point of the clutch levers relatively to the clutching surfaces to compensate for any wear that might take place.

While the drawing illustrates but a single pair of clutch levers, it is to be understood that any number may be employed.

It will be apparent that I have provided a clutch wherein the clutching surfaces thereof are thrown into engagement and disengaged from each other by the same operating mechanism and which is under the direct control of the operator, the tension of engagement of the clutch surfaces may be readily and simply regulated or varied, and all wear between the surfaces of the operating levers and the controlling means may be readily taken up evenly by means of a single adjusting member.

Should it be desired the construction disclosed in Figs. 7 and 8 of the drawings may be employed in connection with the preferred form of device, and when so employed, the springs 42 are of sufficient strength to assist the clutch member in separating when the enlarged head 29 is withdrawn from between the clutch levers 20 and the releasing yoke 32 operated, and they also maintain the clutch member separated when disengaged and prevent the same from rattling.

Having thus described my invention, what I claim is—

1. A friction clutch comprising a drive shaft, a bearing sleeve carried thereby, a friction clutch member rotatably mounted on said bearing sleeve, a friction clutch member coöperating with said first mentioned clutch member and supported by said bearing sleeve, one of said clutch members movable to and from the other member, engaging means for contacting with said movable clutch member for forcing the same into engagement with the coöperating clutch member, releasing means for contacting with the movable clutch member for disengaging the same from contact with the coöperating clutch member, and a manually controlled means for operating said engaging and releasing means in alternation.

2. A clutch comprising a drive shaft, friction clutch members associated therewith, one of said clutch members capable of rotation independently of said shaft and the other of said members being rotatable with said shaft and slidable into engagement with the first mentioned member, engaging means for contacting with said slidable clutch member at one face for forcing the same into engagement with the coöperating clutch member, releasing means contacting with said slidable clutch member at its opposite face for disengaging the same from contact with the coöperating clutch member, and a manually controlled means for operating said engaging and releasing means in alternation.

3. A clutch comprising a drive shaft, a bearing sleeve carried thereby and rotatable therewith, coöperating friction clutching members, one of said members rotatably mounted on said bearing sleeve, and the other of said members rotatable with and slidable along said bearing sleeve for coöperating with said first mentioned clutch member, fulcrumed clutch levers having cam surfaces for contacting with said slidable clutch member for forcing the slidable clutch member into contact with its associated clutch member, releasing means contacting with said slidable clutch member for disengaging the same from its associated member, manually controlled means for operating said clutch levers and releasing means in alternation, and a single means whereby the position of the fulcrum point of said clutch levers may be varied relative to the non-slidable clutch member.

4. A clutch comprising a drive shaft, coöperating friction clutch members associated therewith, one of said clutch members capable of rotation independently of said shaft and the other of said members being rotatable with said shaft and slidable into engagement with the first mentioned member, pivotally mounted clutch levers provided with cam surfaces for coöperating with said slidable clutch member for forcing the same into engagement with the coöperating clutch member, an adjustable means rotatable with said shaft for varying the pivotal point of said levers relative to the non slidable clutch member, releasing means for contacting with said slidable clutch member for disengaging the same from its associated member, and manually controlled means for operating said clutch levers and clutch releasing means in alternation.

5. A clutch comprising a drive shaft, a bearing sleeve carried thereby and rotatable therewith, said sleeve overhanging the end of said shaft and slotted at its outer end, coöperating friction clutch members, one of said clutch members rotatably supported on said bearing sleeve and the other of said members slidably supported on the outer end of said bearing sleeve and rotatable therewith, a collar fitted on the outer end of said bearing sleeve and adjustable thereon, clutch levers extending through said slots in said bearing sleeve and fulcrumed against said adjustable collar, said levers provided with cam surfaces for contacting with said slidable clutch member for forcing the same into engagement with the coöperating member, releasing means within said bearing sleeve and contacting with said slidable clutch member for disengaging the same from its associated member, and manually controlled means for operating said clutch levers and clutch releasing means in alternation.

6. A clutch comprising a driving member, coöperating friction clutch members associated therewith, one of said members capable of rotation independently of said driving member, and the other of said members being rotatable with said driving member and slidable into engagement with said first mentioned member, means for throwing said clutch members into engagement comprising clutch levers provided with cam surfaces for engaging said slidable clutch member and formed at one end with beveled operating surfaces, said levers being provided at their opposite end with fulcrum heads, circumferentially grooved means for receiving said fulcrumed heads adjustable relative to said non-slidable clutch member and providing a fulcrum for the clutch levers adjacent to the cam surfaces thereof, and manually controlled means for engagement with the said beveled operating surfaces of said clutch levers for forcing the cam surfaces thereof into contact with said slidable clutch member.

7. A clutch comprising a driving member, coöperating friction clutch members associated therewith, one of said members capable of rotation independently of said driving member, and the other of said members rotatable with said driving member and slidable into engagement with said first mentioned member, means for throwing said clutch members into engagement, comprising clutch levers provided adjacent their outer ends with cam surfaces for engaging said slidable clutch member and formed at their inner ends with curved operating surfaces, annularly grooved means adjustable relative to said non-slidable clutch member for receiving the outer ends of and providing a pivotal support for the clutch levers adjacent to the cam surfaces thereof, and manually controlled means adapted to be forced between the curved operating surfaces of said clutch levers for operating the same to cause the cam surfaces thereof to force the movable clutch member into engagement with the coöperating clutch member.

8. A clutch comprising a driving member, a pair of coöperating friction clutch members associated therewith, one of said members capable of rotation independently of said driving member and the other of said members being rotatable with said driving member, and slidable into engagement with said first mentioned member, means for operating said clutch members including pivotally mounted cam levers rotatable with said movable clutch member for engaging one surface thereof to force the same into contact with the coöperating clutch member, a releasing yoke rotatable with said slidable clutch member for engaging the opposite face thereof to disengage said clutch members, and a reciprocating manually controlled means extending between said clutch levers and passing through said yoke and provided with an enlarged head, said head adapted on the reciprocation of the said means to operate said clutch levers and said releasing yoke in alternation.

9. A clutch comprising coöperating friction clutch members, one positively driven and the other operated by the driven member and capable of movement into and out of engagement therewith, a plurality of fulcrumed clutch levers coöperating with the movable clutch member for forcing the same into engagement with its coöperating clutch member, a single annularly grooved means carried by the positively driven clutch member for receiving and mounting the outer ends of said fulcrumed levers, and capable of rotation on its support for adjustment relatively to the non-movable clutch member for simultaneously varying the fulcrum point of said clutch levers, and means coöperating with the inner ends of said clutch levers for forcing the same outwardly to cause an engagement of the clutch members.

10. A clutch comprising coöperating friction clutch members, one positively driven and the other operated by the driven member and one capable of movement into and out of engagement with the other, a plurality of fulcrumed clutch levers coöperating with one face of the movable clutch member for forcing the same into engagement with its coöperating member, means for operating said clutch levers, a single adjustable means for varying the fulcrum point of said clutch levers relative to the non-movable member and means coöperating with the opposite face of said movable clutch member and operated by said clutch lever operating means for disengaging said clutch members.

In testimony whereof I have signed my name to this specification in the presence of a subscribing witness.

JULIEN A. BRIED.

Witness:
D. B. RICHARDS.

Copies of this patent may be obtained for five cents each, by addressing the "Commissioner of Patents, Washington, D. C."